United States Patent [19]
Miyazono et al.

[11] Patent Number: 4,959,417
[45] Date of Patent: Sep. 25, 1990

[54] COMPOSITE ACRYLIC RESIN PARTICLES

[75] Inventors: Tadafumi Miyazono, Osaka; Shinichi Ishikura, Kyoto, both of Japan

[73] Assignee: Nippon Paint Co., Ltd., Osaka, Japan

[21] Appl. No.: 189,133

[22] Filed: Apr. 22, 1988

[30] Foreign Application Priority Data

Apr. 22, 1987 [JP] Japan .................................. 62-99440

[51] Int. Cl.$^5$ ...................... C08F 30/04; C08F 275/00
[52] U.S. Cl. .................................... 525/274; 525/284; 525/285; 525/300; 525/301; 525/302; 525/315
[58] Field of Search ......................................... 525/274

[56] References Cited

U.S. PATENT DOCUMENTS 4,833,189  5/1989  Miyazono et al. .................. 525/274
4,833,208  5/1989  Miyazono et al. .................. 525/285

*Primary Examiner*—Jacob Ziegler
*Attorney, Agent, or Firm*—Wenderoth, Lind & Ponack

[57] ABSTRACT

Composite acrylic acrylic resin particles each comprising a particular metal-containing crosslinked acrylic polymer to which a number of substantially linear acrylic polymer chains are chemically bonded are provided. Such particles are specifically useful as resinous filler in curing type coating compositions because of having curing catalytic activities.

6 Claims, No Drawings

COMPOSITE ACRYLIC RESIN PARTICLES

FIELD OF THE INVENTION

The present invention relates to novel composite acrylic resin particles each comprising a particulate metal-containing crosslinked acrylic polymer to which a number of substantially linear acrylic polymer chains are chemically bonded, and being specifically useful in coating compositions.

BACKGROUND OF THE INVENTION

Granular resins are supplied in the forms of emulsions, microgels, non-aqueous dispersion resins (AND resins), powder resins and the like, and have been watched with keen interest in paint industries, especially in aqueous paints, high solid paints and powder paints, because of measuring up to the social requirements of economization of natural resources, energy saving and conservation of good surroundings.

However, such a resin is usually crosslinked so that the characteristics of the resin particles can be fully developed, and therefore when the granular resin is used alone, it is unable to get a uniform or excellent film and the resulted film has a serious drawback of deficient film appearance.

Even when the granular resin is combined with a soluble type resin, there is a case that the viscosity of the mixture is unduly increased, as compared with that of said soluble type resin alone, due to the considerable interaction between the surfaces of said granules and the soluble type resin. Therefore, a great care is often required in the actual use of such combination of resins.

Furthermore, since the characteristics of crosslinked resins are greatly influenced by the nature of surfactant used, crosslinking degree and combination of constituting monomers and the like, heretofore proposed crosslinked resin particles are hardly dispersible in such medium as aliphatic hydrocarbons, high boiling aromatic hydrocarbons, high polar solvents or the like, and once they make agglomerates, hardly get loose to the primary particles. Thus, considerable difficulties are always encountered in the actual application thereof.

It has also been well known to conduct the polymerization of acrylic monomers in multi-stages, thereby obtaining composite acrylic resin particles each having the so-called core-shell structure, the core being composed of crosslinked acrylic polymer and the shell being of crosslinked or non-crosslinked acrylic polymer. When the shell portion is composed of non-crosslinked polymer, a comparatively good dispersion may be obtained with these particles in a soluble type resin or a solvent type coating composition. However, for a better ageing stability, the shell portion should preferably be chemically bonded to the crosslinked core resin, otherwise the non-crosslinked polymer in shell portion will be gradually dissolved in said resin or organic solvent and the dispersion stability of the resin particles will be lost out in time.

Under the circumstances, attempts have been made to effect graft polymerization in multi-stages, thereby chemically bonding the core and the shell layers, as, for example, in Kamata et al. U.S. Pat. No. 4,362,845, Linder U.S. Pat. No. 4,2393,172 and the like.

However, when the heretofore proposed composite resin particles were examined by dispersing them in butyl acetate, treating in a centrifugal machine to dissolve the non-crosslinked polymer into the solvent and measuring the remained particle weight, it was found that the grafting rate was generally in an extremely lower order. And, in fact, the dispersion stability of such resin particles in an organic solvent or resinous varnish was found to be rather poor.

Therefore, it has long been desired to provide novel composite acrylic resin particles each comprising a particulate crosslinked acrylic polymer to which a number of substantially linear acrylic polymer chains are chemically bonded in a high grafting rate, which are free from the drawbacks possessed by the heretofore proposed composite resin particles.

The inventors, having studied hard on the way for chemically bonding linear polymer chains to the surface of particulate crosslinked acrylic polymer, have succeeded in attaining said object by utilizing the selective addition of particular substituted ethylenic bonds and applied for patent on it, as, for example, Japanese Patent Application 90827/86 (now laid open as Kokai No. 246916/87), U.S. patent application 40476, EPC 87303493.8 and the like.

The said method comprises a combination of steps of effecting an emulsion polymerization of a monomer mixture of (A) at least one crosslinking monomer having in its molecule two or more radically polymerizable mono- or 1,1-di-substituted ethylenic unsaturation bonds, or a combination of at least two monomers each having a mutually reactive functional group and one or more radically polymerizable mono- or 1,1-di-substituted ethylenic unsaturation bonds, (B) at least one mono-functional polymerizable monomer other than aromatic compound, and (C) at least one monomer having in its molecule one or more radically polymerizable mono- or 1,1-di-substituted ethylenic unsaturation bonds and one or more radically polymerizable 1,2-di-, 1,1,2-tri- or 1,1,2,2-tetra-substituted ethylenic unsaturation bonds, to obtain an emulsion of crosslinked polymer particles on which radically polymerizable 1,2-di-, 1,1,2-tri- or 1,1,2,2-tetra-substituted ethylenic unsaturation bonds are still remained, and effecting a graft-polymerization of said polymer particles with a polymerizable aromatic compound together with other optional mono-functional polymerizable monomers.

Thus obtained composite resin particles are indeed prominent in that they can be used either singularly or in combination form with other soluble resins customarily used in paint industries, to give excellent coating compositions with good application characteristics and storage stability and capable of resulting a uniform coating with excellent film appearance, but further developments are still demanded both on said coating compositions and said composite resin particles.

That is, in such coating composition, a hardener is usually compounded and the composition is subjected to curing reaction. At that time, a catalyst is usually added to the composition to promote said curing, but the presence of such catalyst may cause additional problem of decrease in durability of cured coating.

The proposed composite resin particles are useless in that subject matter.

Beside the application in coating composition, the proposed composite resin particles may be used as, for example, molding material, additives for agricultural products or plastic film and the like.

In these applications, fungicidal activities or bioactivities are often required, and however, since the resin particles are just developed as resinous filler for coating compositions, such additional functions could not be expected with the composite resin particles themselves. It is, therefore, an object of the invention to provide novel class of composite resin particles each comprising a particulate crosslinked acrylic polymer to which a number of substantially linear acrylic polymer chains are chemically bonded and having other desired activities as, for example, curing catalytic activity, bioactivities and the like. Additional object of the invention is to provide an industrially advantageous method for the preparation of such resin particles.

SUMMARY OF THE INVENTION

According to the invention, the aforesaid objects can be attained with composite acrylic resin particles each comprising a particulate metal-containing crosslinked acrylic polymer to which a number of substantially linear acrylic polymer chains are chemically bonded. The present composite acrylic resin particles may advantageously be prepared by either one of the following methods.

The first method comprises a combination of steps of effecting an emulsion polymerization of a monomer mixture of (A) at least one crosslinking monomer having in its molecule two or more radically polymerizable mono- or 1,1-di-substituted ethylenic unsaturation bonds, or a combination of at least two monomers each having a mutually reactive functional group and one or more radically polymerizable mono- or 1,1-di-substituted ethylenic unsaturation bonds, (B) at least one mono-functional polymerizable monomer other than aromatic compound, and metal-containing monomer hereinunder defined, (C) at least one metal-containing monomer, and (D) at least one monomer having in its molecule one or more radically polymerizable mono- or 1,1-di-substituted ethylenic unsaturation bonds and one or more radically polymerizable 1,2-di-, 1,1,2-tri- or 1,1,2,2-tetra-substituted ethylenic unsaturation bonds, to obtain an emulsion of metal-containing crosslinked polymer particles on which radically polymerizable 1,2-di-, 1,1,2-tri- or 1,1,2,2-tetra-substituted ethylenic unsaturation bonds are still remained, and effecting a graft-polymerization of said polymer particles with a polymerizable aromatic compound together with other optional mono-functional polymerizable monomers.

The second method comprises a combination of steps of effecting an emulsion polymerization of a monomer mixture of (A) at least one crosslinking monomer having in its molecule two or more radically polymerizable mono- or 1,1-di-substituted ethylenic unsaturation bonds, or a combination of at least two monomers each having a mutually reactive functional group and one or more radically polymerizable mono- or 1,1-di-substituted ethylenic unsaturation bonds, (B) at least one mono-functional polymerizable monomer other than aromatic compound, and acid group containing monomer hereinunder defined, (D) at least one monomer having in its molecule one or more radically polymerizable mono- or 1,1-di-substituted ethylenic unsaturation bonds and one or more radically polymerizable 1,2-di-, 1,1,2-tri- or 1,1,2,2-tetra-substituted ethylenic unsaturation bonds, and (E) at least one acid group containing polymerizable monomer, to obtain an emulsion of crosslinked polymer particles containing acid groups and radically polymerizable 1,2-di-, 1,1,2-tri- or 1,1,2,2-tetra-substituted ethylenic unsaturation bonds, reacting thus obtained emulsion with an organic metallic compound in an organic solvent, while removing water from the reaction mixture, to obtain metal-containing crosslinked polymer particles on which radically polymerizable 1,2-di-, 1,1,2-tri- or 1,1,2,2-tetra-substituted ethylenic unsaturation bonds are still remained, and effecting a graft-polymerization of said polymer particles with a polymerizable aromatic compound together with other optional mono-functional polymerizable monomers.

In the present specification and claims, the term "metal" or "metal element" shall mean the element which is located in the left side of the line that links B, Si, As, Te with At in the long form of the periodic table, providing excluding said B, Si, As, Te and At.

The present composite acrylic resin particles are, thus, characterized in that particulate crosslinked acrylic polymer bears metal elements and a number of substantially linear acrylic polymer chains are chemically bonded to said particulate crosslinked acrylic polymer, and that the desired catalytic activities, bioactivities or the like can be expected with said metal elements contained.

The linear polymer chain may be somewhat branched or crosslinked as desired. Therefore, in the specification and claims, the term "substantially linear" shall mean the polymer chains which are essentially of linear type polymer, admitting the presence of a certain degree of branching or crosslinking therein.

As already stated, the present composite acrylic resin particles are advantageously prepared by the following two or three steps.

1. Preparation of core portion of metal-containing crosslinked acrylic polymer:

In this step, the following monomer mixture is polymerized in a conventional emulsion polymerization means (A) at least one crosslinking monomer having in its molecule two or more radically polymerizable mono- or 1,1-di-substituted ethylenic unsaturation bonds, or a combination of at least two monomers each having a mutually reactive functional group and one or more radically polymerizable mono- or 1,1-di-substituted ethylenic unsaturation bonds, (B) at least one mono-functional polymerizable monomer other than aromatic compound, and metal-containing monomer, (C) at least one metal-containing monomer, and (D) at least one monomer having in its molecule one or more radically polymerizable mono- or 1,1-di-substituted ethylenic unsaturation bonds and one or more radically polymerizable 1,2-di-, 1,1,2-tri- or 1,1,2,2-tetrasubstituted ethylenic unsaturation bonds. Examples of crosslinking monomer having in its molecule two or more radically polymerizable mono- or 1,1-di-substituted ethylenic unsaturation bonds, are polymerizable unsaturated monocarboxylic acid esters of polyhydric alcohols, polymerizable unsaturated alcohol esters of polycarboxylic acids and aromatic compounds substituted with two or more vinyl groups.

More specifically, they are, for example, ethyleneglycol diacrylate, ethyleneglycol dimethacrylate, triethyleneglycol dimethacrylate, tetraethyleneglycol dimethacrylate, 1,3-butyleneglycol dimethacrylate, trimethylolpropane triacrylate, trimethylolpropane trimethacrylate, 1,4-butanediol diacrylate, neopentylglycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol alloxy dimethacrylate, 1,1,1-trishydroxymethylethane diacrylate, 1,1,1-trihydroxymethylethane triacrylate, 1,1,1-trishydroxymethylethane dimethacrylate, 1,1,1-trishydroxymethylethane trimethacrylate, 1,1,1-trishydroxymethylpropane diacrylate, 1,1,1-trishydroxymethylpropane triacrylate, 1,1,1-trishydroxymethylpropane dimethacrylate, 1,1,1-trishydroxymethylpropane trimethacrylate, triallyl cyanurate, triallyl isocyanurate, triallyl trimellitate, diallyl terephthalate, diallyl phthalate and divinyl benzene.

Examples of the combination of monomers each having a mutually reactive functional group and one or more radically polymerizable mono- or 1,1-di-substituted ethylenic unsaturation bonds are epoxy containing ethylenically unsaturated monomer (e.g. glycidyl acrylate, glycidyl methacrylate and the like) and carboxyl containing ethylenically unsaturated monomer (e.g. acrylic acid, methacrylic acid, crotonic acid and the like). Various combination of reactive groups are proposed as, for example, amine and carbonyl, epoxy and carboxylic anhydride, amine and acid chloride, alkyleneimine and carbonyl, organoalkoxysilane and carboxyl, hydroxyl and isocyanate and the like, and they are satisfactorily used in the present invention.

As the mono-functional polymerizable monomer other than aromatic compound and metal-containing monomer, the following may be used.

(1) carboxyl group containing monomer as, for example, acrylic acid, methacrylic acid, crotonic acid, itaconic acid, maleic acid, fumaric acid and the like, (2) hydroxyl group containing monomer as, for example, 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol, methallyl alcohol and the like, (3) nitrogen containing alkyl acrylate or methacrylate as, for example, dimethyl aminoethyl acrylate, dimethyl aminoethyl methacrylate and the like, (4) polymerizable amide as, for example, acryl amide, methacryl amide and the like, (5) polymerizable nitrile as, for example, acrylonitrile, methacrylonitrile and the like, (6) alkyl acrylate or methacrylate as, for example, methyl acrylate, methyl methacrylate, ethyl acrylate, n-butyl acrylate, n-butyl methacrylate, 2-ethyl hexyl acrylate and the like, (7) polymerizable glycidyl compound as, for example, glycidyl acrylate, glycidyl methacrylate and the like, (8) α-olefin as, for example, ethylene, propylene and the like, (9) vinyl compound as, for example, vinyl acetate, vinyl propionate and the like,

(10) reaction compounds of the abovesaid monomers as, for example, reaction compound of hydroxyl containing monomer (2) with isocyanate compound, reaction compound of carboxyl containing monomer (1) with glycidyl containing compound and the like.

Among various mono-functional polymerizable monomers, aromatic compounds (e.g. styrene, styrene derivative and the like) should not be used at this stage, since they are selectively reactive with 1,2-di-, 1,1,2-tri- or 1,1,2,2-tetra-substituted ethylenic unsaturation bonds and hence, are not suitable for the preparation of core portion of metal-containing crosslinked acrylic polymer still having a number of grafting points (i.e. 1,2-di-, 1,1,2-tri- or 1,1,2,2-tetra-substituted ethylenic unsaturations) thereof. Metal-containing polymerizable monomers are likewise omitted from this group of monomers, because they are defined as an essential monomer separately.

Examples of metal-containing monomers are metal esters or metal salts of polymerizable organic acids as, for example, acrylic acid, methacrylic acid, itaconic acid, maleic acid and the like; vinyl metals; styryl metals and the like. The metal element may also bear other groups as hydroxyl group, organic acid residue, substituted or unsubstituted alkyl group and the like.

More specifically, said metal-containing monomers are exemplified by zinc mono-acrylate, zinc monomethacrylate, zinc diacrylate, zinc dimethacrylate, tributyl tin acrylate, tributyl tin methacrylate, dibutyl tin diacrylate, dibutyl tin dimethacrylate, dihydroxy aluminium acrylate, dihydroxy aluminium methacrylate, hydroxy aluminium diacryalte, hydroxy aluminium dimethacrylate, acryloyl ferrocene, methacryloyl ferrocene, furyl acryloyl ferrocene, furyl methacryloyl ferrocene, acryloyl zirconium octate, methacryloyl zirconium octate, acryloxy zirconium laurate, methacryloxy zirconium laurate, isopropyl acryloyl diisostearoyl titanate, isopropyl methacryloyl diisostearoyl titanate, isopropyl diacryroyl isostearoyl titanate, isopropyl dimethacryroyl isostearoyl titanate, triethyl germanium acrylate, triethyl germanium methacrylate, styryl triethyl germane, vinyl triethyl germane, diphenyl lead diacrylate, diphenyl lead methacrylate, styryl triethyl lead and the like. They may be represented by either one of the formulae:

$(CH_2=CH)_x M''R_{n-x}$, $(CH_2=CHC_6H_4)_x M''R_{n-x}$, and $(CH_2=CR'COO)_x M''R_{n-x}$ (wherein M stands for metal element, R is substituted or unsubstituted alkyl, substituted or unsubstituted phenyl or hydroxyl, R' represents hydrogen atom or methyl group, n is valency of said metal, and x is an integer which is smaller than n).

Examples of the monomer having in its molecule one or more radically polymerizable mono- or 1,1-di-substituted ethylenic unsaturation bonds and one or more radically polymerizable 1,2-di-, 1,1,2-tri- or 1,1,2,2-tetra-substituted ethylenic unsaturation bonds, are addition product of maleic acid and glycidyl acrylate, addition product of maleic acid and glycidyl methacrylate, addition product of fumaric acid and glycidyl acrylate, addition product of fumaric acid and glycidyl methacrylate, addition product of maleic acid monoester and glycidyl acrylate, maleic acid monoester and glycidyl methacrylate, addition product of fumaric acid monoester and glycidyl acrylate, addition product of fumaric acid monoester and glycidyl methacrylate, addition product of substituted maleic acid and glycidyl (meth) acrylate, addition product of substituted maleic acid monoester and glycidyl (meth) acrylate, addition product of substituted fumaric acid and glycidyl (meth) acrylate, and addition product of substituted fumaric acid monoester and glycidyl (meth) acrylate.

The emulsion polymerization may be carried out in a conventional way, using a polymerization initiator and an appropriate emulsifier. Particularly preferable emulsifiers are acrylic, polyester, alkyd or poxy resin having in its molecule an amphoionic group of the formula:

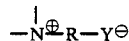

wherein R represents $C_1$ to $C_6$ alkylene or phenylene and $Y^\ominus$ stands for $-COO^\ominus$ or $-SO_3^\ominus$, as disclosed in Japanese Patent Application Kokai No. 129066/83.

In this first step of polymerization, only mono- or 1,1-di-substituted ethylenic bonds may participate in the reaction, giving crosslinked acrylic polymer particles still having unreacted 1,2-di-, 1,1,2-tri- or 1,1,2,2-tetra-substituted ethylenic unsaturation bonds on the surfaces thereof. Such core portion of metal-containing crosslinked acrylic polymer may also be prepared in two steps, comprising polymerizing, in an emulsion polymerization, a monomer mixture of (A) at least one crosslinking monomer having in its molecule two or more radically polymerizable mono- or 1,1-disubstituted ethylenic unsaturation bonds, or a combination of at least two monomers each having a mutually reactive functional group and one or more radically polymerizable mono- or 1,1-di-substituted ethylenic unsaturation bonds, (B) at least one mono-functional polymerizable monomer other than aromatic compound and acid group containing monomer hereinunder defined, (D) at least one monomer having in its molecule one or more radically polymerizable mono- or 1,1-di-substituted ethylenic unsaturation bonds and one or more radically polymerizable 1,2-di-, 1,1,2-tri- or 1,1,2,2-tetrasubstituted ethylenic unsaturation bonds, and (E) at least one acid group containing polymerizable monomer, to obtain an emulsion of crosslinked polymer particles containing acid groups and radically polymerizable 1,2-di-, 1,1,2-tri- or 1,1,2,2-tetra-substituted ethylenic unsaturation bonds, and then reacting thus obtained emulsion with at least one metallic compound in an organic solvent, while removing water from the reaction mixture, to obtain metal-containing crosslinked polymer particles on which radically polymerizable 1,2-di-, 1,1,2-tri- or 1,1,2,2-tetra-substituted ethylenic unsaturation bonds are still remained.

In the first step reaction, the same monomeric compounds (A), (B) and (D) as already mentioned in connection with the preceding one step method are used, together with acid group containing polymerizable monomer (E).

Examples of such monomer (E) are acrylic acid, methacrylic acid, crotonic acid, itaconic acid, maleic acid, fumaric acid and the like.

And thus obtained crosslinked polymer particles having on their surfaces acid groups and radically polymerizable ethylenic unsaturation bonds are then reacted with at least one metallic compound in an organic solvent in the second step. At that time, the desired metal element may be introduced to the polymer particles by any of the known techniques. However, the most preferable and advantageous method is to use esterification or ester-exchange reaction between said acid group and metallic compound. As the metallic compounds to be used in that reaction, mention is made of metal oxides, metal halogenides and metal hydroxides as, for example, magnesium chloride, calcium oxide, chromium chloride, zinc oxide, tributyl tin oxide, dibutyl tin oxide, triethyl tin chloride, tribenzyl tin chloride, diethyl aluminium chloride, aluminium hydroxide, sodium hydroxide, potassium hydroxide, calcium hydroxide and the like. 2. Preparation of the present composite acrylic resin particles each comprising a particulate metal-containing crosslinked acrylic polymer to which a number of substantially linear acrylic polymer chains are chemically bonded:

To thus obtained core particle emulsion, a polymerizable aromatic compound is added and polymerization is continued to effect a graft polymerization between the remaining ethylenic unsaturation bonds and the polymerizable aromatic compound. Since 1,2-di-, 1,1,2-tri- or 1,1,2,2-tetra-substituted ethylenic bond has a selective reactivity towards polymerizable aromatic compound as styrene, α-methyl styrene, vinyl toluene, t-butyl styrene and the like, a higher grafting rate can be attained with the aforesaid particulate metal-containing crosslinked polymer coupled with the polymerizable aromatic compound.

It is of course possible to use, besides the required polymerizable aromatic compound, other polymerizable monomers for the preparation of said linear polymer chains as desired. Any of the mono-functional polymerizable monomers hereinbefore stated under the column "preparation of core portion of crosslinked acrylic polymer" may satisfactorily be used.

Furthermore, since a certain degree of branching or crosslinking is permissible according to circumstances, a limited amount of crosslinking monomer may be used together, as desired.

In any case, the shell portion of the present composite resin particles should be composed of substantially linear acrylic polymer and grafted to the crosslinked polymer core. Various desired properties may be given to the present composite resin particles by the selection of grafting monomers. For example, when the aforesaid monomers (1) or (3) are selected, the composite resin particles having carboxyl or amino containing polymer chains can be obtained, said particles having selfcatalytic function in curing, high reactivity with an epoxy compound and being useful in an anionic or cationic electrodeposition use. When hydroxyl containing monomers are used, the resulted composite resin particles may be crosslinked with a melamine resin and/or isocyanate compound to give a tough coating. When the aforesaid monomers (4), addition products of hydroxyl containing monomers and monoisocyanate compounds or addition products of isocyanate containing monomers and monoamine compounds are used, it is possible to obtain the composite crosslinked resin particles with highly crystalline polymer chains, which are useful in having structural viscosity and rheology control in a coating composition.

It is also possible to carry on the linear polymer chains various functional groups and utilize the characteristic properties thereof.

The present composite acrylic resin particles are excellent in dispersibilities in various solvents and resinous varnishes and possess self-film forming properties.

Various functional polymers can be chemically bonded on the surface of the particulate crosslinked acrylic polymer. Since the desired metal elements can be carried on the core portions of these particles, curing catalytic activities or bioactivities are given to the present composite acrylic resin particles themselves. Therefore, they are specifically useful in paint and other chemical industries. The invention shall be now more fully explained in the following Examples. Unless otherwise being stated, all parts and percentages are by weight.

Reference Example 1

Preparation of dispersion stabilizer

Into a 2 liters flask fitted with a stirrer, a nitrogen gas inlet tube, a thermoregulator, a condenser and a decanter, were placed 134 parts of bishydroxy ethyl taurine, 130 parts of neopentylglycol, 236 parts of azelaic acid, 186 parts of phthalic anhydride and 27 parts of xylene and the mixture was heated while removing the formed water azeotropically with xylene. The temperature was raised to 190° C. in about 2 hours from the commencement of reflux and the reaction was continued under stirring and dehydration until the acid value (based on carboxylic acid group) reached 145. Thereafter, the reaction mixture was allowed to cool to 140° C. and to this, 314 parts of Cardura E-10 (glycidyl versatate, trademark of Shell) were dropwise added in 30 minutes at 140° C. The mixture was stirred at the same temperature for 2 hours and then the reaction was stopped to obtain a polyester resin having an acid value of 59, a hydroxyl value of 90 and a number average molecular weight of 1054.

Reference Example 2

Preparation of dispersion stabilizer

Into a similar reaction vessel as used in Reference Example 1, were placed 73.5 parts of taurine Na salt, 100 parts of ethyleneglycol, and 200 parts of ethyleneglycol monomethyl ether, and the mixture was heated, under stirring, to 120° C. At the stage when a uniform solution was obtained, a mixture of 470 parts of Epicohto 1001 (bisphenol A diglycidyl ether type epoxy resin, epoxy equivalent 470, trademark of Shell Chem.) and 400 parts of ethyleneglycol monomethyl ether was dropwise added in 2 hours. After completion of said addition, the combined mixture was heated and stirred for 20 hours. Thus obtained product was then purified and dried to obtain 518 parts of modified epoxy resin, whose acid value (measured by KOH titration method) was 49.4 and sulfur content (measured by fluorescent X ray analysis) was 2.8%.

Reference Example 3

Preparation of dispersion stabilizer

Into a 1 liter flask fitted with a stirrer, a thermoregulator, dropping funnels, a nitrogen gas inlet tube and a condenser, were placed 140 parts of ethyleneglycol monomethyl ether and 140 parts of xylene, and the mixture was heated to 120° C. To this, a monomer mixture of 74 parts of methyl methacrylate, 70 parts of 2-ethylhexylacrylate, 24 parts of 2-hydroxyethyl methacrylate, and 12 parts of methacrylic acid, added with 5 parts of azobis-isobutyronitrile and a solution of 20 parts of N-(3-sulfopropyl)-N-methacryloyloxyethyl-N,N-dimethyl ammonium betaine in 150 parts of ethyleneglycol monoethyl ether were simultaneously and dropwise added in 3 hours. After elapsing 30 minutes from the completion of said addition, a solution of 0.4 part of t-butylperoxy-2-ethylhexanoate in 8 parts of ethylene glycol monomethyl ether was added and the combined mixture was kept at 120° C. for 1 hour and thereafter, the solvent was removed off to obtain an amphoionic group containing acrylic resin having a non-volatile content of 92%.

Reference Example 4

Preparation of monomer containing two polymerizable ethylenic groups each having different co-reactivity Into a 1 liter flask fitted with a stirrer, an air inlet tube, a thermoregulator, and a condenser, were placed 430 parts of n-butyl maleate and 1.6 parts of hydroquinone and the mixture was heated to 150° C. To this, were dropwise added 373 parts of glycidyl methacrylate in 20 minutes and the combined mixture was maintained at 150° C. for 60 minutes. The reaction was stopped at the stage when the resinous acid value reached 3 KOH mg/g.

Example 1

Into a 1 liter flask fitted with a stirrer, a thermoregulator, a dropping funnel, a nitrogen gas inlet tube and a condenser, were placed 306 parts of deionized water and the temperature was raised to 80° C. Separately, a pre-emulsion was prepared by providing an aqueous dispersion stabilizer solution comprising 30 parts of the amphoionic group containing polyester resin obtained in Reference Example 1, 3 parts of dimethylethanolamine and 170 parts of deionized water, and gradually adding, while stirring in a Disper, a mixture of 40 parts of methyl methacrylate, 4 parts of n-butyl acrylate, 20 parts of monomer of Reference Example 4, 48 parts of ethyleneglycol dimethacrylate, and 8 parts of tributyl tin methacrylate thereto.

An aqueous initiator solution was also prepared in a separate vessel, by mixing 2 parts of azobiscyanovaleric acid, 1.2 parts of dimethylethanolamine and 40 parts of deionized water. To the aforesaid reaction flask, the initiator solution and the pre-emulsion were dropwise added, in 80 minutes and 60 minutes, respectively. However, the addition of said pre-emulsion was started after elapsing 10 minutes from the commencement of addition of said initiator solution. Then, the combined mixture was kept standing at 80° C. for 30 minutes, dropwise added with a mixture of 32 parts of styrene, 24 parts of methyl methacrylate, 12.8 parts of n-butyl acrylate and 11.2 parts of 2-hydroxyethyl methacrylate, and a solution of 1.0 part of azobis-cyanovaleric acid, 0.6 part of dimethylethanolamine and 20 parts of deionized water in 40 minutes, and the combined mixture was kept at the same temperature for 1 hour. Average grain diameter of thus obtained composite crosslinked resin particles in emulsion, determined by light-scattering photometer, was 94 nm. Thus obtained emulsion was then subjected to a freeze-drying to obtain composite, tin-containing crosslinked resin particles. The composite, crosslinked resin particles were easily dispersed in xylene and butyl acetate. The average grain diameters of the resin particles in xylene and in butyl acetate were 186 nm and 198 nm, respectively.

The abovementioned organic solvent dispersions were applied on glass plates by using a doctor blade (20 mils), and dried to obtain clear coatings.

Tin content of the respective composite resin particle was 11,000 ppm (measured by fluorescent X ray analyzer).

Example 2

Into a similar reaction vessel as used in Example 1, were placed 292 parts of deionized water and the content was heated to 80° C. Separately, a pre-emulsion was prepared by providing an aqueous dispersion stabilizer solution comprising 24 parts of the amphoionic group containing epoxy resin obtained in Reference Example 2, 2.4 parts of dimethylethanolamine and 170 parts of deionized water, and gradually adding, while stirring in a disper, a mixture of 40 parts of methyl methacrylate, 2 parts of n-butyl acrylate, 70 parts of 1,6-hexanediol dimethacrylate, 20 parts of monomer of Reference Example 4, and 8 parts of zinc monomethacrylate thereto.

An aqueous initiator solution was also prepared in a separate vessel, by mixing 2 parts of azobiscyanovaleric acid, 1.2 parts of dimethylethanolamine and 40 parts of deionized water. To the aforesaid reaction flask, the initiator solution and the pre-emulsion were dropwise added, in 70 minutes and 60 minutes, respectively. However, the addition of said pre-emulsion was started after elapsing 10 minutes from the commencement of addition of said initiator solution. Then, the combined mixture was kept standing at 80° C. for 30 minutes, dropwise added with a mixture of 20 parts of styrene, 20 parts of n-butyl acrylate, and 20 parts of methyl methacrylate, and a solution of 1.0 part of azobiscyanovaleric acid, 0.6 part of dimethylethanolamine and 20 parts of deionized water in 30 minutes, and the combined mixture was kept at the same temperature for 1 hour. Average grain diameter of thus obtained composite crosslinked resin particles in emulsion was 104 nm (measured by light-scattering photometer).

Thus obtained emulsion was then subjected to spray-drying to obtain composite, zinc-containing crosslinked resin particles. These particles could be easily dispersed in 30% solid concentration in both xylene and butyl acetate. The average grain diameters in these dispersing mediums were 178 nm and 197 nm, respectively.

The abovementioned organic solvent dispersions were applied by using a Doctor blade (20 mils) on glass plates and dried to obtain clear coatings. Zn content of the respective resin particle was, when analyzed by fluorescent X-ray analyzer, 15000 ppm in solid.

Example 3

Into a similar reaction vessel as used in Example 1, were placed 292 parts of deionized water and the content was heated to 80° C. Separately, a pre-emulsion was prepared by providing an aqueous dispersion stabilizer solution comprising 24 parts of the amphoionic group containing acryl resin obtained in Reference Example 3, 2.4 parts of dimethylethanolamine and 170 parts of deionized water, and gradually adding, while stirring in a disper, a mixture of 20 parts of methyl methacrylate, 12 parts of n-butyl acrylate, 60 parts of 1,6-hexanediol dimethacrylate, 20 parts of monomer of Reference Example 4, and 8 parts of methacryloxy zirconium octate thereto.

An aqueous initiator solution was also prepared in a separate vessel, by mixing 2 parts of azobiscyanovaleric acid, 1.2 parts of dimethylethanolamine and 40 parts of deionized water. To the aforesaid reaction flask, the initiator solution and the pre-emulsion were dropwise added, in 80 minutes and 70 minutes, respectively. However, the addition of said pre-emulsion was started after elapsing 10 minutes from the commencement of addition of said initiator solution. Then, the combined mixture was kept standing at 80° C. for 30 minutes, dropwise added with a mixture of 24 parts of styrene, 32 parts of n-butyl acrylate, and 24 parts of methyl methacrylate, and a solution of 1.0 part of azobiscyanovaleric acid, 0.6 part of dimethylethanolamine and 20 parts of deionized water in 30 minutes, and the combined mixture was kept at the same temperature for 1 hour. Average grain diameter of thus obtained composite crosslinked resin particles in emulsion was 106 nm (measured by light-scattering photometer).

Thus obtained emulsion was then subjected to freeze-drying to obtain composite, zirconium-containing crosslinked resin particles. These particles could be easily dispersed in 30% solid concentration in both xylene and butyl acetate. The average grain diameters in these dispersing mediums were 201 nm and 224 nm, respectively.

The abovementioned organic solvent dispersions were applied by using a Doctor blade (20 mils) on glass plates and dried to obtain clear coatings. Zr content of the respective resin particle was, when analyzed by fluorescent X-ray analyzer, 10,000 ppm in solid.

Example 4

Into a similar reaction vessel as used in Example 1, were placed 306 parts of deionized water and the content was heated to 80° C. Separately, a pre-emulsion was prepared by providing an aqueous dispersion stabilizer solution comprising 30 parts of the amphoionic group containing polyester resin obtained in Reference Example 1, 3 parts of dimethylethanolamine and 190 parts of deionized water, and gradually adding, while stirring in a disper, a mixture of 80 parts of methyl methacrylate, 18 parts of n-butyl acrylate, 80 parts of ethylene glycol dimethacrylate, 2 parts of methacrylic acid and 20 parts of monomer of Reference Example 4 thereto.

An aqueous initiator solution was also prepared in a separate vessel, by mixing 2 parts of azobiscyanovaleric acid, 1.2 parts of dimethylethanolamine and 40 parts of deionized water. To the aforesaid reaction flask, the initiator solution and the pre-emulsion were dropwise added, in 80 minutes and 70 minutes, respectively. However, the addition of said pre-emulsion was started after elapsing 10 minutes from the commencement of addition of said initiator solution. Then, the combined mixture was kept standing at 80° C. for 1 hour.

In a round bottom flask, were placed 383 parts of thus obtained crosslinked resin particle emulsion, 3.5 parts of tributyl tin oxide and 200 parts of butyl acetate and the combined mixture was stirred at 70° C. in an evaporator until no more water had come out, to obtain a dispersion in butyl acetate having a solid content of 40%.

Next, in a similar reaction vessel as used in Example 1, were placed 296 parts of said dispersion, 117 parts of butyl acetate, 10 parts of styrene, 10 parts of methyl methacrylate and 10 parts of n-butyl acrylate and the combined mixture was heated to 110° C. and then dropwise added with an initiator solution comprising 1 part of t-butyl peroxy 2-ethyl hexanoate and 50 parts of butyl acetate in 30 minutes. After completion of said addition, the combined mixture was aged for 3 hours, to obtain 30% dispersion of tin-containing composite crosslinked resin particles in butyl acetate. Thus obtained dispersion was applied by using a Doctor blade (20 mils) on a glass plate and dried to obtain a clear coating. The tin content of the respective particle was 9200 ppm in solid.

Comparative Example 1

Into a similar reaction vessel as used in Example 1, were placed 292 parts of deionized water and the content was heated to 80° C. Separately, a pre-emulsion was prepared by providing an aqueous dispersion stabilizer solution comprising 24 parts of the amphoionic group containing epoxy resin obtained in Reference Example 2, 2.4 parts of dimethylethanolamine and 170 parts of deionized water, and gradually adding, while stirring in a disper, a mixture of 40 parts of methyl methacrylate, 2 parts of n-butyl acrylate, 70 parts of 1,6-hexanediol dimethacrylate, and 8 parts of zinc monomethacrylate thereto.

An aqueous initiator solution was also prepared in a separate vessel, by mixing 2 parts of azobiscyanovaleric acid, 1.2 parts of dimethylethanolamine and 40 parts of deionized water. To the aforesaid reaction flask, the initiator solution and the pre-emulsion were dropwise added, in 70 minutes and 60 minutes, respectively. However, the addition of said pre-emulsion was started after elapsing 10 minutes from the commencement of addition of said initiator solution. Then, the combined mixture was kept standing at the same temperature for 1 hour.

The average grain diameter of thus obtained crosslinked resin particles in emulsion was 94 nm (determined by light-scattering photometer). The emulsion was then subjected to spray-drying to obtain Zn containing crosslinked resin particles. Thus obtained resin particles were re-dispersed in 30% solid content, in xylene and in butyl acetate and however, uniform dispersions could not be obtained. When applied by 20 mil Doctor blade on a glass plate and dried, the applied dispersions failed to form coatings in both cases.

Comparative Example 2

The same procedures as stated in Example 1 were repeated excepting omitting the monomer of Reference Example 4. The average grain diameter of the resin particles in emulsion was 85 nm. Thus obtained emulsion was then subjected to freeze-drying, and the resin particles thus obtained were re-dispersed in 30% solid content in xylene and butyl acetate. In either case, good dispersion could not be obtained. Then the dispersion was applied onto a glass plate by the help of 20 mils doctor blade and dried, considerable agglomerates were found in the formed coating. The coating was translucent and there was a clear phase separation in it.

What is claimed is:

1. Composite acrylic resin particles each comprising a particulate metal-containing crosslinked acrylic polymer in which the metal constitutes part of the crosslinked acrylic polymer structure, to which metal-containing crosslinked acrylic structure, a number of substantially linear acrylic polymer chains are chemically bonded, prepared by a combination of steps of effecting an emulsion polymerization of a monomer mixture of:
   (A) at least one crosslinking monomer having in its molecule two or more radically polymerizable mono- or 1,1-di-substituted ethylenic unsaturation bonds, or a combination of at least two monomers each having a mutually reactive functional group and one or more radically polymerizable mono- or 1,1-di-substituted ethylenic unsaturation bonds,
   (B) at least on mono-functional polymerizable monomer other than aromatic compounds and metal-containing monomer hereinunder defined,
   (C) at least one metal-containing monomer, and
   (D) at least one monomer having in its molecule one or more radically polymerizable mono- or 1,1-di-substituted ethylenic unsaturation bonds and one or more radically polymerizable 1,2-, 1,1,2-tri- or 1,1,2,2-tetra-substituted ethylenic unsaturation bonds, to obtain an emulsion of metal-containing crosslinked polymer particles on which radically polymerizable 1,2-di-, 1,1,2-tri- or 1,1,2,2-tetra-substituted ethylenic unsaturation bonds still remain therein, and effecting a graft-polymerization of said polymer particles with a polymerizable aromatic compound together with other optional monofunctional polymerizable monomers.

2. The particles according to claim 1, wherein the crosslinking monomer having in its molecule two or more radically polymerizable mono- or 1,1-di-substituted ethylenic unsaturation bonds is selected from the group consisting of polymerizable unsaturated monocarboxylic acid ester of polyhydric alcohol, polymerizable unsaturated alcohol ester of polycarboxylic acid and aromatic compound substituted with two or more vinyl groups.

3. The particles according to claim 1, wherein the combination of two monomers each having a mutually reactive functional group and one or more radically polymerizable mono- or 1,1-di-substituted ethylenic unsaturation bonds are the two monomers each having a mutually reactive functional group and one or more acryloyl, methacryloyl or crotonoyl group.

4. The particles according to claim 3, wherein the mutually reactive functional group is expoxy group to carboxyl group, amine group to carbonyl group, epoxy group to acid anhydride, amine group to acid chloride, alkylene imine group to carbonyl, organo-alkoxy silan to carboxyl, and hydroxyl group to isocyanate group.

5. The particles according to claim 1, wherein the monomer having in its molecule one or more radically polymerizable mono- or 1,1-di-substituted ethylenic unsaturation bonds and one or more radically polymerizable 1,2-di-, 1,1,2-tri- or 1,1,2,2-tetra-substituted ethylenic unsaturation bonds is an addition product of maleic or fumaric acid and glycidyl (meth) acrylate, an addition product of maleic or fumaric acid monoester and glycidyl (meth) acrylate, addition product of substituted maleic or fumaric acid and glycidyl (meth) acrylate, addition product of substituted maleic or fumaric acid monoester and glycidyl (meth) acrylate.

6. The particles according to claim 1, wherein the metal containing mono-functional polymerizable monomer is a compound having a metal element selected from Zn, Sn, Al, Fe, Zr, Ti, Ge and Pb and a radically polymerizable mono- or 1,1-di-substituted ethylenic unsaturation bond.

* * * * *